United States Patent
Nitti et al.

(10) Patent No.: US 10,661,681 B2
(45) Date of Patent: May 26, 2020

(54) SYSTEM FOR AUTOMATIC POSITIONING OF A RAILWAY OVERHEAD LINE

(71) Applicant: TESMEC S.P.A., Milan (IT)

(72) Inventors: Antonio Nitti, Castellana Grotte (IT); Alberto Oscar, Castro (IT)

(73) Assignee: TESMEC S.P.A., Milan (IT)

(*) Notice: Subject to any disclaimer, the term of this patent is extended or adjusted under 35 U.S.C. 154(b) by 13 days.

(21) Appl. No.: 16/311,202

(22) PCT Filed: Jul. 26, 2017

(86) PCT No.: PCT/IB2017/054525
§ 371 (c)(1),
(2) Date: Dec. 19, 2018

(87) PCT Pub. No.: WO2018/025124
PCT Pub. Date: Feb. 8, 2018

(65) Prior Publication Data
US 2019/0232817 A1    Aug. 1, 2019

(30) Foreign Application Priority Data

Aug. 5, 2016    (IT) .......................... 102016000082789

(51) Int. Cl.
*B60M 1/28* (2006.01)
*E04H 12/00* (2006.01)
*E04H 12/24* (2006.01)

(52) U.S. Cl.
CPC ............... *B60M 1/28* (2013.01); *E04H 12/00* (2013.01); *E04H 12/24* (2013.01)

(58) Field of Classification Search
CPC . B60M 1/00; B60M 1/28; B60M 3/00; B60M 7/00; E04H 12/00
See application file for complete search history.

(56) References Cited

U.S. PATENT DOCUMENTS

| 3,877,390 | A | * | 4/1975 | Wallace | B60F 1/043 105/159 |
| 5,016,544 | A | * | 5/1991 | Woollam | B60F 1/043 105/215.2 |
| 5,048,797 | A | * | 9/1991 | Theurer | B60M 1/28 254/134.3 R |
| 5,704,295 | A | * | 1/1998 | Lohr | B62D 1/265 104/243 |
| 5,826,860 | A | * | 10/1998 | Theurer | B60M 1/28 254/134.3 R |

(Continued)

FOREIGN PATENT DOCUMENTS

| DE | 202005020320 U1 | 3/2006 |
| EP | 0675069 A1 | 10/1995 |

(Continued)

*Primary Examiner* — Lee D Wilson
(74) *Attorney, Agent, or Firm* — King & Schickli, PLLC

(57) ABSTRACT

A system for automatic positioning of a railway overhead line comprising: a mechanical arm (12); a first hooking device (31) that can be fixed to the end of the mechanical arm (12); a mast (40) for positioning an overhead line; a second fixed hooking device (41), which is fixed to the mast (40) and can be fixed to the first hooking device (31); the mast (40) comprising at least one horizontal arm (52), set on which is a set of rollers (53), with roller head, for correct positioning of an overhead line.

11 Claims, 6 Drawing Sheets

(56) References Cited

U.S. PATENT DOCUMENTS

| | | | | |
|---|---|---|---|---|
| 6,193,215 | B1 * | 2/2001 | Glemet | B60M 1/28 254/134.3 PA |
| 6,896,243 | B2 * | 5/2005 | Theurer | B60M 1/28 254/134.3 R |
| 7,048,256 | B2 * | 5/2006 | Theurer | B60M 1/28 254/134.3 R |
| 2019/0232817 | A1 * | 8/2019 | Nitti | B60M 1/28 |

FOREIGN PATENT DOCUMENTS

| | | |
|---|---|---|
| EP | 1465311 A1 | 10/2004 |
| GB | 1342840 A | 1/1974 |
| WO | WO2011141089 A2 | 11/2011 |

\* cited by examiner

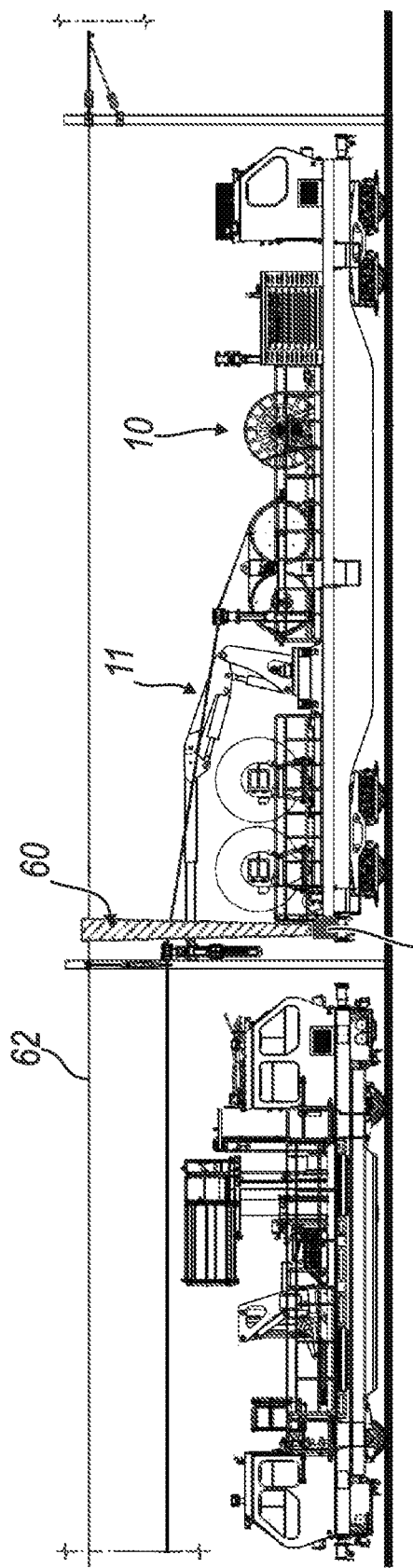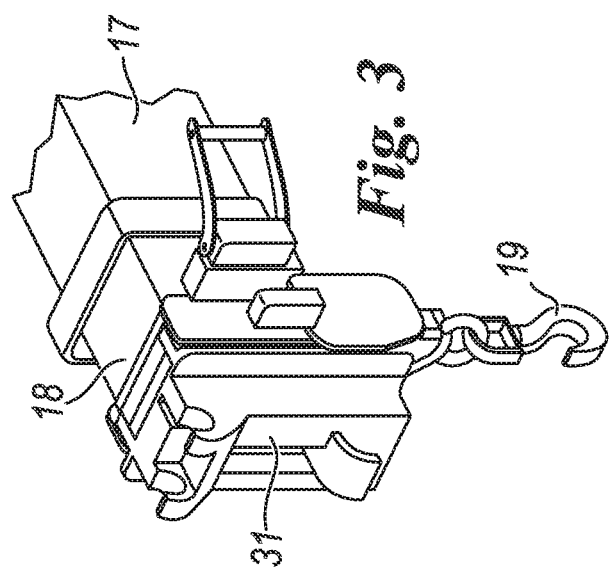

US 10,661,681 B2

SYSTEM FOR AUTOMATIC POSITIONING OF A RAILWAY OVERHEAD LINE

The present invention relates to a system for automatic positioning of a railway overhead line.

BACKGROUND

Over the years, for the operations of stringing and maintenance of railway overhead lines, methods have been used that have depended upon existing technological solutions, which have been adopted for the construction of the operating machinery. However, these solutions meant that the above machinery could provide only limited operating performance.

The technological progress that has occurred over time has markedly improved the level of performance of the operating machinery, making available to the railway maintenance staff vehicles with increasingly high working performance: In particular, one of the major advances has regarded the units used for stringing overhead conductors.

Pullers or tensioners for stringing overhead conductors have evolved, from simple carriages equipped with a bullwheel for generating pulling or braking tension (whether single or in one or two pairs) and with other structures for guiding and supporting the conductors, into puller-tensioners. Puller-tensioners are operating machines that enable stringing of the conductors at the final operating tension, thus minimizing the manual effort required for geometrical positioning, both in a lateral direction and in height, through particular structures available to the operators (referred to as "masts").

The devices currently used for laying the cable (conductor or support rope) are constituted by particular structures that enable manual positioning by sight on the part of the operator.

Their movement may moreover be limited by the presence of the conductors that have to remain in place in comparison to the ones that have to be replaced.

Some devices equipped with double bracket are moreover subject to the movement of the entire arm for correct positioning, thus causing imprecision due to the play and the masses of the structures involved.

The above devices are consequently subject to positioning errors (due to the intrinsic nature of the manual system), and there must consequently be envisaged adjustments, subsequent to laying and stringing of the conductors/support ropes, by further vehicles that follow the tensioning carriage with diagnostic pantograph or with counterweights of the infrastructure Consequently, the devices currently used present: uncertainty in positioning of the conductor/support rope; slowness of the operations of laying of the cable; problems of safety inherent in the operations performed manually; need for further specific vehicles for diagnostic operations on the cable installed.

SUMMARY

The aim of the present invention is to provide a system for automatic positioning of a railway overhead line that will overcome the drawbacks of the known art.

According to the present invention, the above aim and others still are achieved by a system for automatic positioning of a railway overhead line comprising: a mechanical arm; a first hooking device that can be fixed to the end of said mechanical arm; a mast for positioning an overhead line; and a second fixed hooking device, which is fixed to said mast and can be fixed to said first hooking device; said mast comprising at least one horizontal arm, set on which is a set of rollers, with roller head, for correct positioning of an overhead line.

Further characteristics of the invention are described in the dependent claims.

Thanks to the present invention, the mast has the maximum possibility and freedom of spatial development, both for overcoming and avoiding the obstacles present (constituted by the conductors laid and by the various components of the overhead line itself) and for being able to reach the points of anchorage or mooring of the contact wires (which usually are located at a considerable height and at a distance to one side of the railway line).

The possibility of hooking and unhooking the mast to/from the mechanical arm provides a greater freedom and on the railway vehicle during the displacements.

Added to the above is the amount of movements possible for the mechanical arm, which enables positioning in the desired points.

BRIEF DESCRIPTION OF THE DRAWING FIGURES

The characteristics and advantages of the present invention will emerge clearly from the ensuing detailed description of a practical embodiment thereof, illustrated by way of non-limiting example in the annexed drawings, wherein:

FIG. 1 shows a railway vehicle including a system for automatic positioning of a railway overhead line, according to the present invention;

FIG. 3 shows the end of a mechanical arm of a system for automatic positioning of a railway overhead line, according to the present invention;

DETAILED DESCRIPTION OF THE INVENTION

Figure 2:
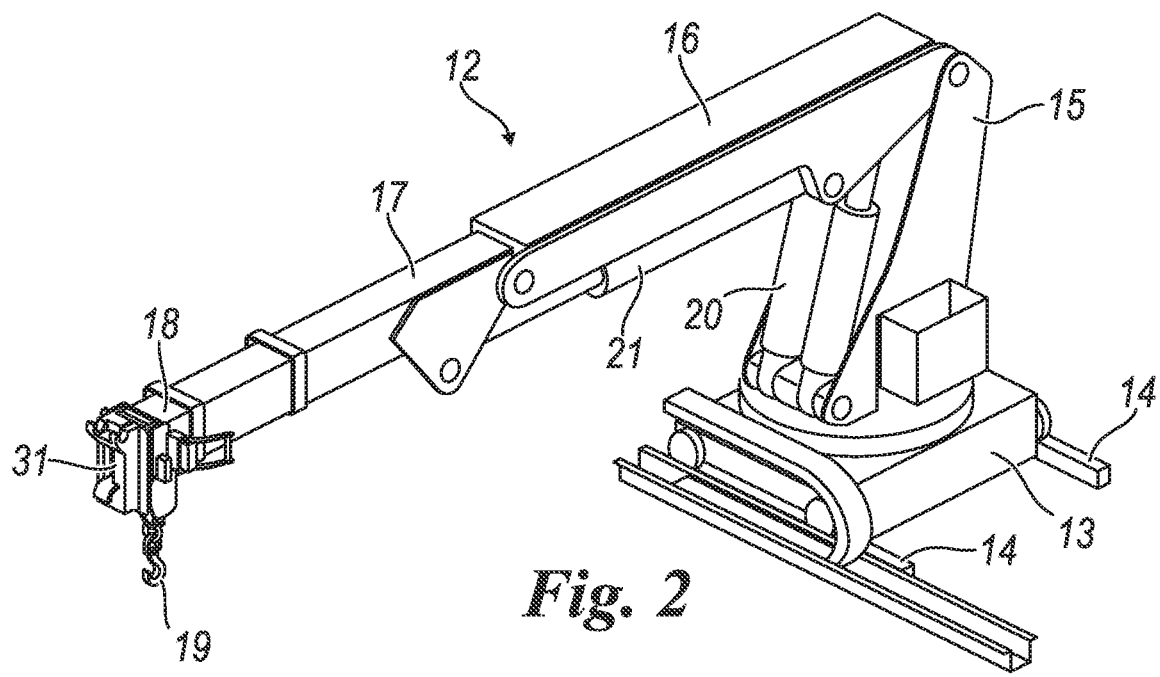
FIG. 2 shows a mechanical arm of a system for automatic positioning of a railway overhead line, according to the present invention.
Figure 4:
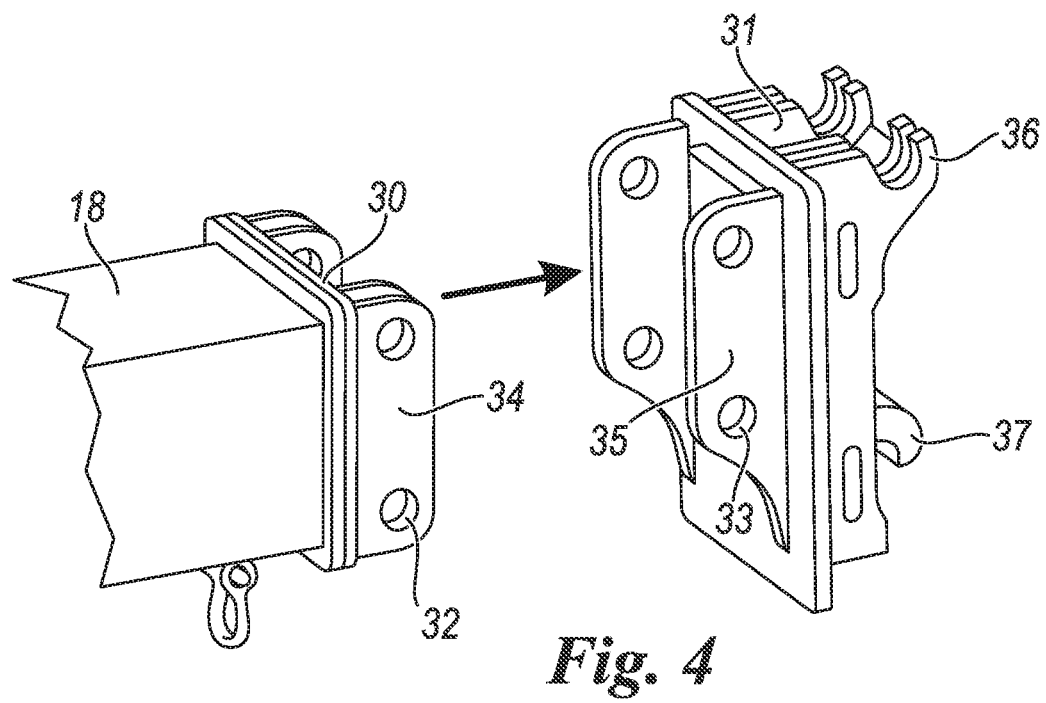
FIG. 4 shows a hooking device during fixing to the end of a mechanical arm of a system for automatic positioning of a railway overhead line, according to the present invention.
Figure 5:
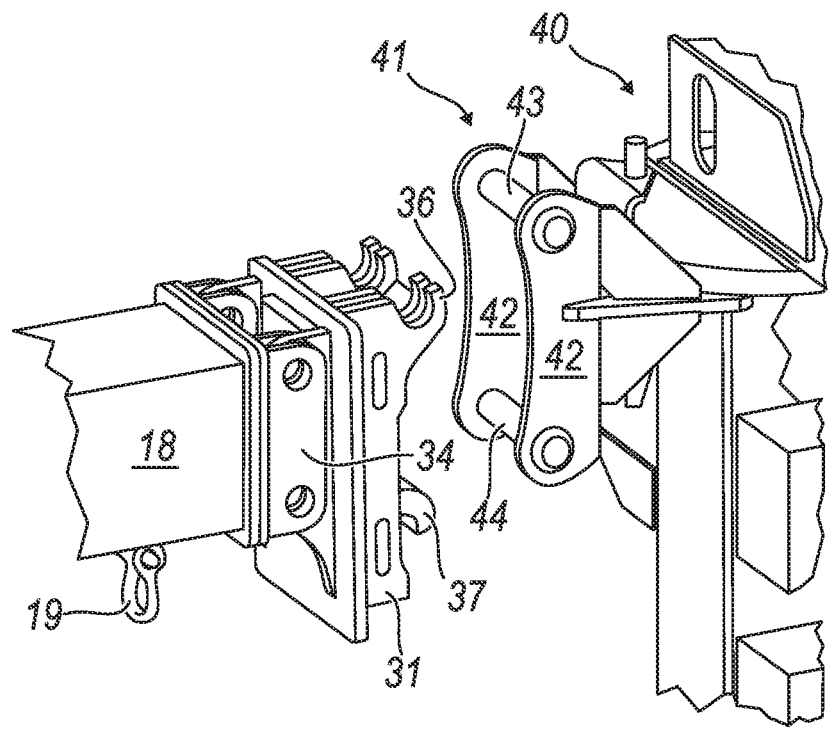
FIG. 5 shows a mast during hooking to the hooking device of a system for automatic positioning of a railway overhead line, according to the present invention.
Figure 6:
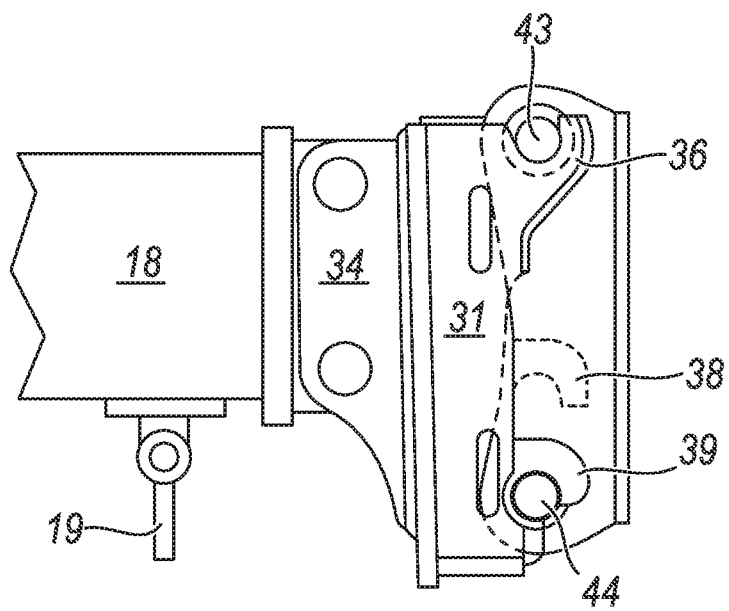
FIG. 6 shows a mast hooked to the hooking device of a system for automatic positioning of a railway overhead line, according to the present invention.
Figure 7:
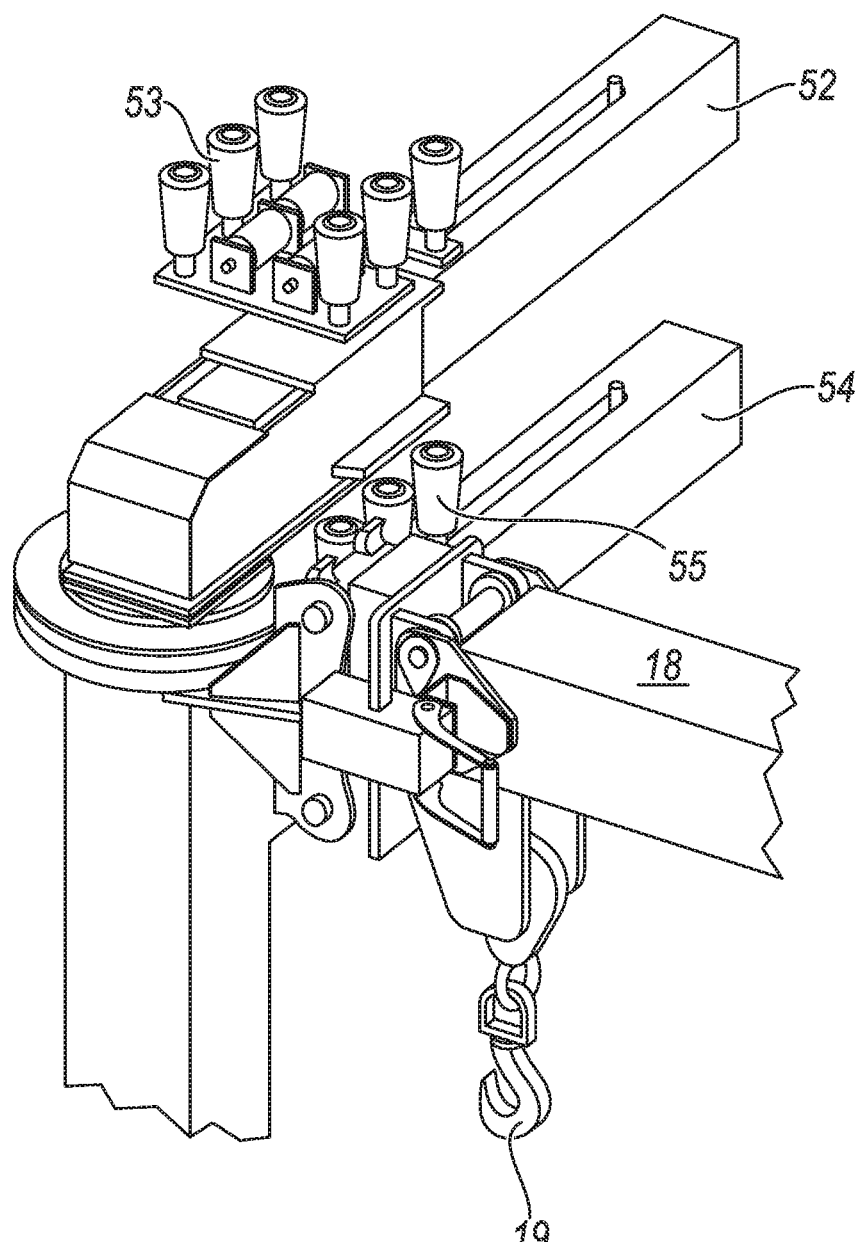
FIG. 7 shows a mast fixed to a mechanical arm of a system for automatic positioning of a railway overhead line, according to the present invention.
Figure 8:
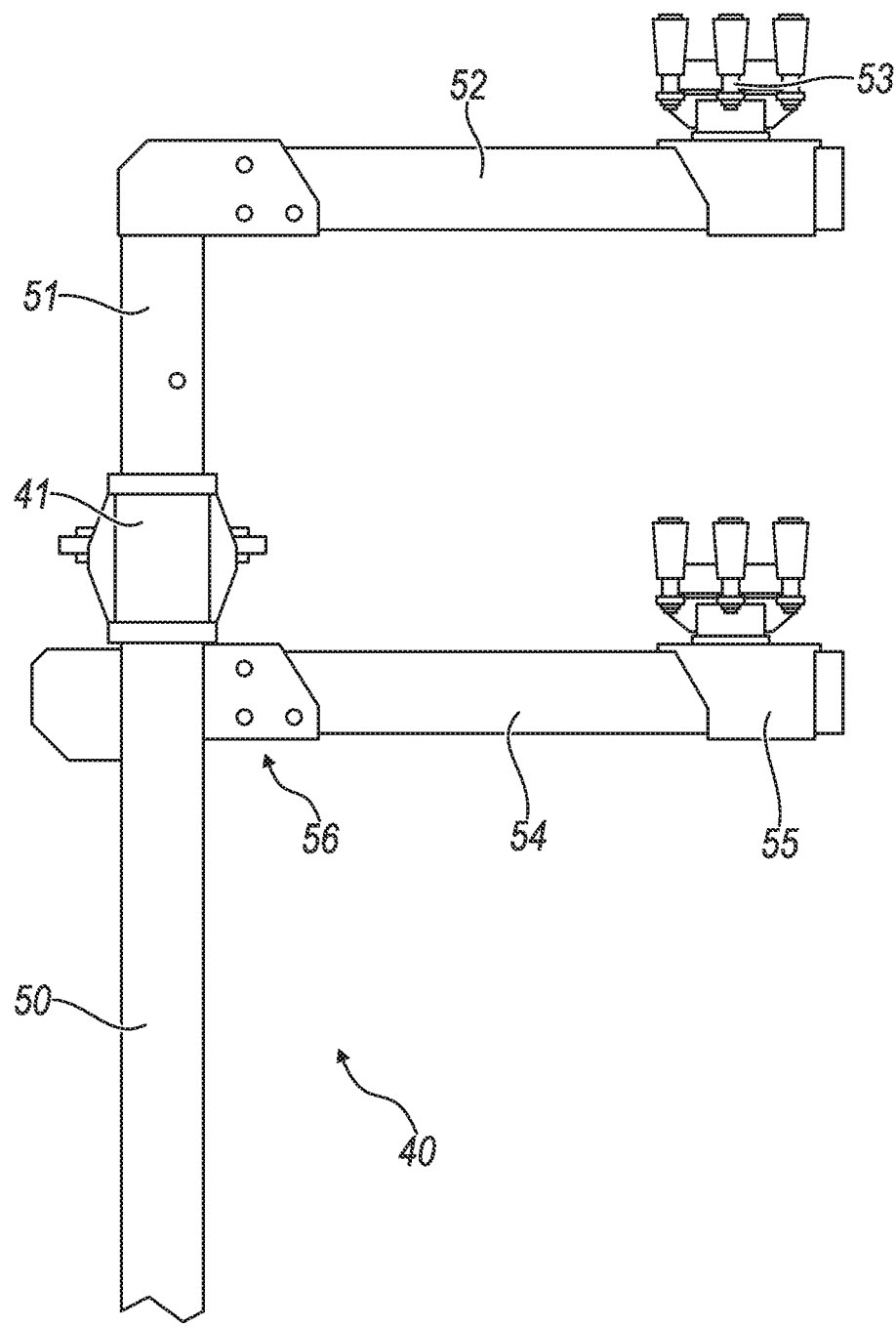
FIG. 8 shows a mast, in the working position, of a system for automatic positioning of a railway overhead line, according to the present invention.
Figure 9:
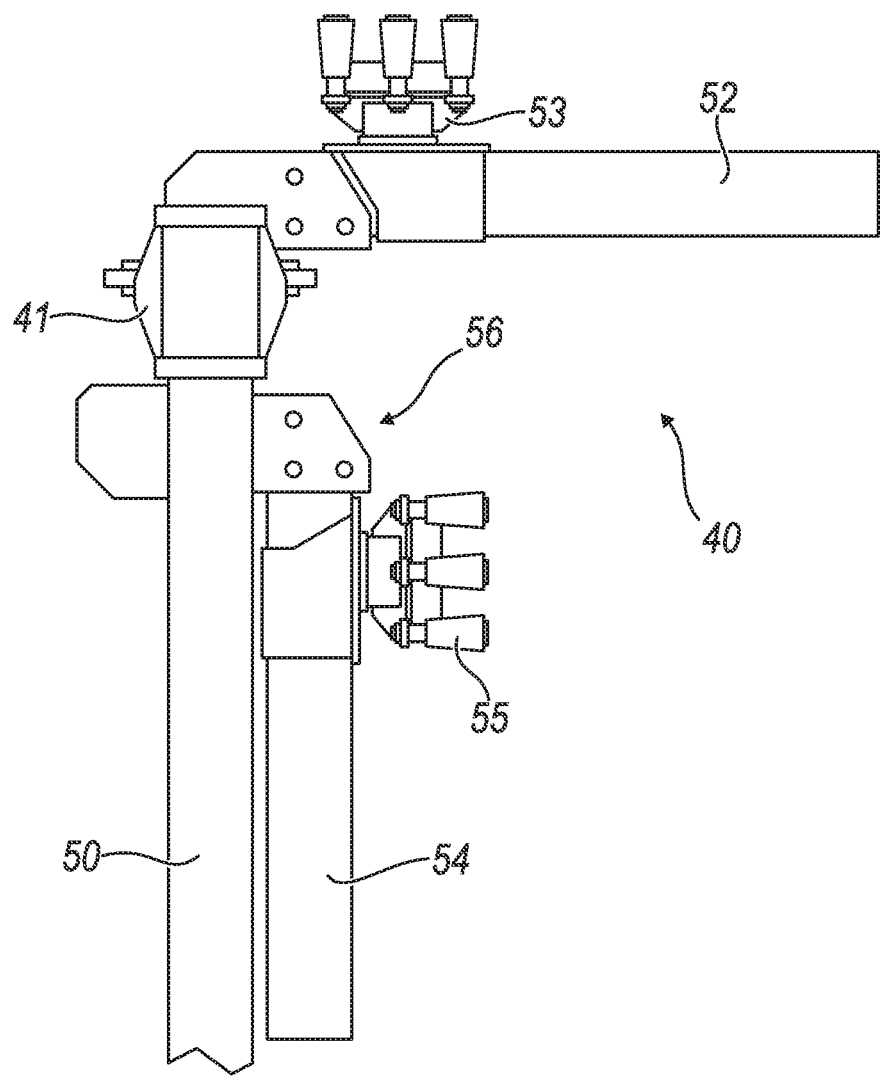
FIG. 9 shows a mast, in the resting position, of a system for automatic positioning of a railway overhead line, according to the present invention.

With reference to the attached figures, a railway vehicle 10, used for maintenance of a railway overhead line comprises a system 11 for automatic positioning of a railway overhead line, according to the present invention.

The system 11 comprises a mechanical arm 12, having a base 13 installed on a translating slide 14, and a column 15, which can rotate about the base 13. Also comprising, in succession, a first articulate, arm 16, a second articulated arm 17, and a third telescopic arm 18.

The arm 16 has an end that can rotate (in a plane) about one end of the column 15.

The arm 17 has an end that can rotate (in a plane) about one end of the arm 16.

The articulated arms 17 and 18 are driven by the actuators 20 and 21.

The movement of the mechanical arm 12 is preferably entrusted to a radio remote control; there is envisaged the presence of manual controls (set on the column) and of a manual/electric pump for restoring the device into the parking position in conditions of emergency or in the event of blocking of the main hydraulic supply circuit.

The mechanical arm 12 has the characteristic of being usable for guiding/positioning both the conductor and the support rope simultaneously and is specific for the operations of maintenance of the overhead line.

The mechanical arm 12 has been designed in such a way as to guarantee a stiffness of the structure with precise and articulated displacements even in the presence of considerable jumps, enabling the operations of mooring to the post or to the portal.

In order to be able to operate conveniently with the mechanical arm 12 alongside the overhead line, the base is installed on a slide that is able to translate thanks to roller bearings and hydraulic cylinders.

The mechanical arm 12 is equipped with the following electronic devices, which guarantee safety of the device used on vehicles operating on the railway infrastructure:

electronic load limiter with alarm signal at 90% of the maximum load, with blocking of all the movements that might cause toppling at 100% of the maximum load (the system blocks all the movements that increase the load moment and only allows re-entry movements);

mechanical and electronic intertrack limiter for preventing any interference on the intertrack space; and redunded encoder rotation limiter for determining the exact rotation of the column.

Fixed at the end 30 of the third, telescopic, arm 18 is a lifting hook 19 (for loading and unloading the reels), and a first hooking device 31 can be fixed by means of pins that are inserted through purposely provided holes 32 and 33, respectively, set on flanges 34 provided on the end of the third, telescopic, arm 18 and on flanges 35 provided on the hooking device 31.

The first hooking device 31, on the side opposite to the flanges 35, comprises at the top hooks 36, which are fixed and face upwards at the centre of the hooks 37, which can slide vertically, upon command, and, face downwards.

The hooks 36 and 37 are used for hooking a mast 40 to the mechanical arm 12.

The mast 40 comprises a second fixed hooking device 41, which includes two lateral shoulders 42, and two transverse bars, a top one 43 and a bottom one 44, fixed to the shoulders.

The bars 43 and 44 are pre-arranged for co-operating with the hooks 36 and 37.

The mast 40, and in particular the second fixed hooking device 41, is brought up to the first hooking device 31, from above, in such a way that the top bar 43 rests on the top hooks 36.

The hooks 37 are first set in the top working point 38 so that the bar 44 can flank the first hooking device 31. Then the hooks 37 are lowered to the bottom working point 39 so as to hook onto the bar 44.

Hooking of the hooks 36 and 37 onto the bars 43 and 44 is obtained with a hydraulic actuator driven by a radio remote control.

The mast 40 comprises a vertical rod 50, fixed on which is the second fixed hooking device 41, which comprises inside it another telescopic vertical rod 51 driven by a hydraulic cylinder.

Fixed at the top end of the telescopic rod 51 and extending laterally therefrom is a horizontal bracket 52, set on which is a set of rollers 53, with roller head, for correct positioning of the top conductor/support rope.

The set of rollers 53 translates horizontally by means of a hydraulic motor that drives a wormscrew set inside the bracket 52.

Fixed on the rod 50 underneath the point of attachment of the second fixed hooking device 41 and extending laterally therefrom is a horizontal bracket 54 set on which is a set of rollers 55, with roller head, for correct positioning of the bottom conductor/support rope.

The set of rollers 55 translates horizontally by means of a hydraulic motor that drives a wormscrew set inside the bracket 54.

The bracket 54 comprises means 56 for enabling it to be knocked down and positioned vertically alongside the rod 50.

This configuration (articulated sections and telescopic section with articulated head and transverse brackets) enables the mechanical arm 12 to reach all the heights necessary for the stringing operations, and in particular, with the transverse bracket, the conductors can be positioned correctly and easily without interfering with the overhead line being installed.

To determine the correct position of the vehicle on the track (even on stretches with superelevation), the system is equipped with a purposely designed compensation device 65, which, via two laser beams set in positions corresponding to the wheels of a carriage and an inclinometer set on the vehicle, makes it possible to determine the position of the vehicle relative to the global reference system of the railway track.

The parameters of height and polygonation of the conductor 63 are measured via a laser beam 60 emitted by a scanner 61 positioned on the rear part of the vehicle, which scans an area through an angle of 90° and detects the correct position of the conductor 63 via triangulation of the beams emitted.

Triangulation of the laser beams through interpolation and trigonometric calculation enables detection of the correct position of the conductor 63.

The position of the support rope 62 is detected via the data of extension received from the mast head are managed simultaneously with the data of position of the conductor 63.

The input data for the line to be installed are entered into the positioning system, and automatically the mechanical arm 12 carries out a feedback regulation of the position of the conductor/support rope on the basis of the information received from the laser scanner.

The system is moreover able to store to memory the parameters measured during laying of the cables on a computer on board the vehicle to enable display and review in the office.

The system is equipped with GPS antenna and GSM-R antenna to enable location of the vehicle and remote transmission of the data.

In addition to the position from the GPS antenna, the system is able to correct the position of the vehicle at a fixed point along the path of the track, interconnected with the datum of the incremental encoder on the axle of the vehicle.

The materials used for providing the system for automatic positioning of a railway overhead line, as well as the dimensions, may be any according to the requirements and to the state of the art.

The system thus devised may undergo numerous modifications and variations, all of which fall within the scope of the inventive idea; moreover, all the details may be replaced by technically equivalent elements.

The invention claimed is:

1. A system for automatic positioning of a railway overhead line, comprising: a mechanical arm (12); a first hooking device (31) that can be fixed to the end of said mechanical arm (12); a mast (40) for positioning an overhead line; and a second fixed hooking device (41), which is fixed to said mast (40) and can be fixed to said first hooking device (31); said mast (40) comprising at least one horizontal arm (52), set on which is a set of rollers (53), with roller head, for correct positioning of an overhead line.

2. The system according to claim 1, characterized in that said mechanical arm (12) comprises a first, articulated, arm (16) and a second, articulated, arm (17), and a third, telescopic, arm (18).

3. The system according to claim 1, characterized in that said mechanical arm (12) can rotate about a base (13).

4. The system according to claim 1, characterized in that said mechanical arm (12) comprises a base (13) installed on a translating slide (14).

5. The system according to claim 1, characterized in that said mechanical arm (12) comprises at its end a lifting hook (19).

6. The system according to claim 1, characterized in that said first hooking device (31) comprises first fixing means (35) for being fixed to the end of said mechanical arm (12).

7. The system according to claim 1, characterized in that said first hooking device (31) comprises second hooking means (36, 37) for being fixed to said mast (40).

8. The system according to claim 1, characterized in that said first hooking device (31) comprises second hooking means (36, 37) for being fixed to said mast (40).

9. The system according to claim 8, characterized in that said second hooking means (36, 37) comprise hooks (37) that can be moved upon command.

10. The system according to claim 1, characterized in that it comprises two laser beams and an inclinometer for determining the position of the vehicle relative to the global reference system of the rail.

11. The system according to claim 1, characterized in that it comprises a scanner (61), which emits a laser beam for measuring the parameters of height and polygonation of the conductor via triangulation of the emitted beam.

* * * * *